United States Patent [19]
Griebhammer et al.

[11] Patent Number: 5,717,301
[45] Date of Patent: Feb. 10, 1998

[54] ELECTRIC MOTOR ASSEMBLY

[75] Inventors: Albrecht Griebhammer, Viktring, Austria; Hugo Schemmann, Landgraaf, Netherlands

[73] Assignee: U.S. Philips Corporation, New York, N.Y.

[21] Appl. No.: 608,908

[22] Filed: Feb. 29, 1996

[30] Foreign Application Priority Data

Mar. 1, 1995 [EP] European Pat. Off. .............. 95200503

[51] Int. Cl.$^6$ ..................................................... H02P 06/24
[52] U.S. Cl. .................... 318/286; 318/291; 318/254; 318/439
[58] Field of Search ..................... 318/254, 138, 318/439, 291, 280, 266, 283, 287, 282, 286

[56] References Cited

U.S. PATENT DOCUMENTS

| | | | |
|---|---|---|---|
| 4,251,758 | 2/1981 | Pedersen et al. .................. | 318/138 |
| 4,514,676 | 4/1985 | Grandjean et al. ................. | 318/696 |
| 4,706,005 | 11/1987 | Iwako ................................... | 318/603 |
| 5,059,876 | 10/1991 | Shah ..................................... | 318/254 |
| 5,493,188 | 2/1996 | Yoshikawa et al. ................. | 318/254 |

FOREIGN PATENT DOCUMENTS

WO95/00072  1/1995  WIPO .................. A61B 5/04

*Primary Examiner*—John W. Cabeca
*Attorney, Agent, or Firm*—Edward Blocker

[57] ABSTRACT

An electric motor having a permanent magnet rotor and a stable with two poles and two windings and electronic switching for controlling commutation. To ensure that the motor starts under heavy load conditions, commutation is delayed during a predetermined period of time while the rotor is travelling in a forward direction of rotation to suppress the associated braking torque.

8 Claims, 5 Drawing Sheets

ELECTRIC MOTOR ASSEMBLY

BACKGROUND OF THE INVENTION

The invention relates to an electric motor assembly comprising a power input for connecting the motor assembly to a DC power source, a stator with coil means being conceived to generate a magnetic stator field with a first polarisation when connected to said power source according to a first mode and being conceived to generate a magnetic stator field with a second opposite polarisation when connected to said power source according a second mode, a permanent magnet rotor with a magnetic rotor field, said rotor being rotatable in a forward and a reverse direction of rotation and having a rotor position angle θ, said angle θ being defined as being zero when the rotor field is opposite to the first polarisation of the stator field, the value of θ increasing upon rotation of the rotor in the forward direction of rotation, detection means being conceived to generate a first position signal when the rotor position angle θ satisfies the relation $$-\beta < \theta < -\beta + 180°$$

and being conceived to generate a second position signal for other θ, β being a precommutation angle having a predetermined value between 0° and 180° defining precommutation positions θ=−β and θ=−β+180°, switching means connected to the detection means, said switching means being conceived to connect the power input to the coil means according to said first mode in reaction to receiving the first position signal and to connect the power input to the coil means according to said second mode in reaction to receiving the second position signal so as to commute the coil means when the rotor reaches the precommutation positions, urging means being conceived to urge the rotor in a first rest position or a second rest position when the motor is inoperative, said first and second rest positions being related to a predetermined rest angle γ according to the relation $$\theta = -\gamma$$

for the first rest position and according to the relation $$\theta = -\gamma + 180°$$

for the second rest position, said rest angle having a predetermined value in the range $$0 < \gamma < \beta,$$

control means situated between the detection means and the switching means, said control means comprising delay means for delaying the position signal with a delay time DT.

Such an electric motor assembly is known from U.S. Pat. No. 4,251,758. The known assembly comprises a motor with a permanent magnet rotor and a stator with two poles and two windings and electronic switching elements for the windings controlled by switching signals occurring in push-pull. The switching signals are derived from position signals of a sensor detecting the angular position of the rotor. The rotor of the known assembly has a neutral position in which the magnetic field of the rotor is aligned with the stator poles. In that neutral position a stator field does not generate a torque on the rotor. An additional permanent magnet on the stator is provided to ensure that the rotor has a rest position which is displaced with respect to the neutral position such that the rest position is situated 5° before the neutral position viewed in the rotation direction of the rotor in operating conditions.

By shifting the commutation positions in a direction opposite to the direction of rotation, the power of a motor can be increased with higher speeds. Said shift of the commutation positions is also known as precommutation. The position signal is a block signal with transitions at precommutation positions of the rotor which are situated before the rest position so that in normal operating conditions the windings are switched before the rotor reaches its neutral position to obtain precommutation. The use of a motor having precommutation is interesting in an environment in which the load of the motor is high with high operating speeds such as, for example, in kitchen utensils such as ice cream making machines and mixers.

When the known motor assembly is connected to a power source the rotor will be driven in the reverse direction because the rest position is situated between the precommutation position and the neutral position. After reaching the precommutation position the windings would be switched and the rotor would be submitted to a braking torque and then be driven in the forward direction until the precommutation position is reached again and the rotor would be braked again etc. This would cause the rotor to oscillate around the precommutation position as long as the rotor does not pass the neutral position so that the motor would not start. To counteract these starting problems the assembly comprises a modulating circuit which suppresses the fast transition of the position signal during a predetermined delay time when the rotor is rotating in the reverse direction of rotation. This delay causes the rotor to rotate a substantial angular distance in the reverse direction before rotating in the forward direction during starting. When reaching the precommutation position again the rotor will have a larger momentum to overcome the breaking torque which is effective between the precommutation position and the neutral position at relatively low speed of the rotor so that the rotor may pass the neutral position and the motor may start. A disadvantage of the known motor assembly however, is that the motor assembly will not start under heavy load conditions.

SUMMARY OF THE INVENTION

It is an object of the invention to provide an electric motor assembly of the kind described in the opening paragraph which will start even under heavy load conditions. To achieve this object, the electric motor assembly according to the invention is characterized in that the control means are conceived to apply a delay time DT>0 when the rotor rotates in the forward direction of rotation during a predetermined control period S. As explained above a braking torque will be applied to the rotor when passing the precommutation positions at relatively low speed. Due to this measure this braking torque will be suppressed when the rotor is rotating in the forward direction of rotation during the control period. Hence the load which can be driven by the motor from stand still is much larger than with the known assembly. Preferably the control period is chosen such that the delay time DT is effective during at least two revolutions of the rotor.

In some applications, such as an icecream maker, the load of the motor may vary largely from time to time. To avoid mechanical damage, the rotor speed needs to be limited. To this end a speed limiter as described in the prior PCT patent application nr. IB95/00072(PHN 14730) may be used. This speed limiter will drive the motor in a synchron mode on basis of a predetermined frequency at a predetermined rotation speed. Under low load conditions the motor may reach a speed corresponding to the second harmonic of said frequency and lock on that speed. With the measures according to the invention, the speed can be reduced to the predetermined speed by activating the delay time DT during a control period S upon detection of a speed above the desired rotation speed of the rotor. At relatively high speed of the rotor the delay causes a braking torque on the rotor so that the speed is reduced and the speed limiter will lock on the predetermined rotation speed.

An embodiment of the electric motor assembly according to the invention is characterized in that the control period S is set to begin when the motor assembly is energized so that a delay time DT is also applied when the rotor rotates in the reverse direction of rotation. This embodiment is advantageous since it can be realized with simple electronic means.

An embodiment of the electric motor assembly according to the invention is characterized in that the control period S is set to begin at a point of time after one of the precommutation positions $\theta=-\beta$ or $\theta=-\beta+180°$ is reached for the first and before that precommutation position is reached for the second time. Accordingly DT=0 when that precommutation position is reached during rotation of the rotor in the reverse direction and DT>0 when that precommutation position is reached during rotation of the rotor in the forward direction. Due to this measure the rotor rotates in the reverse direction over a limited rotation angle which is important for certain applications. For instance in a icecream maker the load of the motor can vary from nearly unloaded to a very heavy load since the icecream maker may contain liquid or ice. To ensure starting under such heavy load conditions a very long DT should be chosen so that the rotor may come to standstill at a neutral position due to the rotation in the reverse direction when it is nearly unloaded. As no torque can be applied to the rotor in a neutral position the motor will then fail to start. By only applying a delay time when the rotor is rotating in the forward direction of rotation, such a standstill due to rotation in the reverse direction is counteracted since the commutation of the coil means will be effected immediately when the rotor reaches the precommutation position. Furthermore, a limited rotation in the reverse direction makes the motor assembly according to the invention suitable for applications where such a rotation is unwanted for instance for safety reasons.

An embodiment of the electric motor assembly according to the invention is characterized in that during the control period S, the delay time DT satisfies the relation $\beta/(60\omega) \leq DT \leq \beta/(20\omega)$, wherein $\beta$ is expressed in ° and $\omega$ is the desired angular speed of the rotor expressed in °/s at the end of the control period S. We found that choosing DT from this range assures the motor torque to be positive up to the angular speed $\omega$ so that the motor is able to reach that speed. Preferably, the desired angular speed of the rotor at the end of the control period should be chosen such that the motor will continue to run without the delay. This desired angular speed should be chosen as low as possible and the delay time should be chosen as high as possible so as to obtain the highest load under which the motor will start.

An embodiment of the electric motor assembly according to the invention is characterized in that $30° < \beta < 50°$ $5° < \gamma < 15°$ $100 < \omega < 600 °/s$ $0.2 < S < 2s$.

Choosing the parameters from these ranges results in an electric motor assembly with a good power performance and good starting characteristics in relation to the volume and production costs of the motor. This makes the motor especially suitable for household appliances such as a lemon squeezer, a tin-opener or an icecream maker.

An embodiment of the electric motor assembly according to the invention is characterized in that the delay time DT is gradually reduced to zero during the control period S. At the beginning of the control period the rotor will have a low speed so that a large delay time DT will result in a good suppression of the breaking torque resulting in an optimal driving torque averaged over one revolution of the rotor. Near the end of the control period the rotor will have a relatively high speed. The commutation of the polarisation of the stator field is such that a small DT results in an optimal average driving torque.

An embodiment of the electric motor assembly according to the invention is characterized in that during the control period S the delay time DT is made dependent of the rotation speed of the rotor, the delay time DT being reduced with increasing rotation speed of the rotor. Due to these measures the above mentioned effect will even be independent from the motor load.

An embodiment of the electric motor assembly according to the invention is characterized in that the control means comprise a programmed microcomputer. With a microcomputer the control means can easily be adapted to the specific load conditions of the application of the motor assembly. Moreover, in many applications a microcomputer is already present so that the control means can be realized without additional costs.

BRIEF DESCRIPTION OF THE DRAWINGS

Embodiments of the invention are represented in the drawing and will be further described hereafter, in which.

DETAILED DESCRIPTION OF THE PREFERRED EMBODIMENTS

Figure 1:
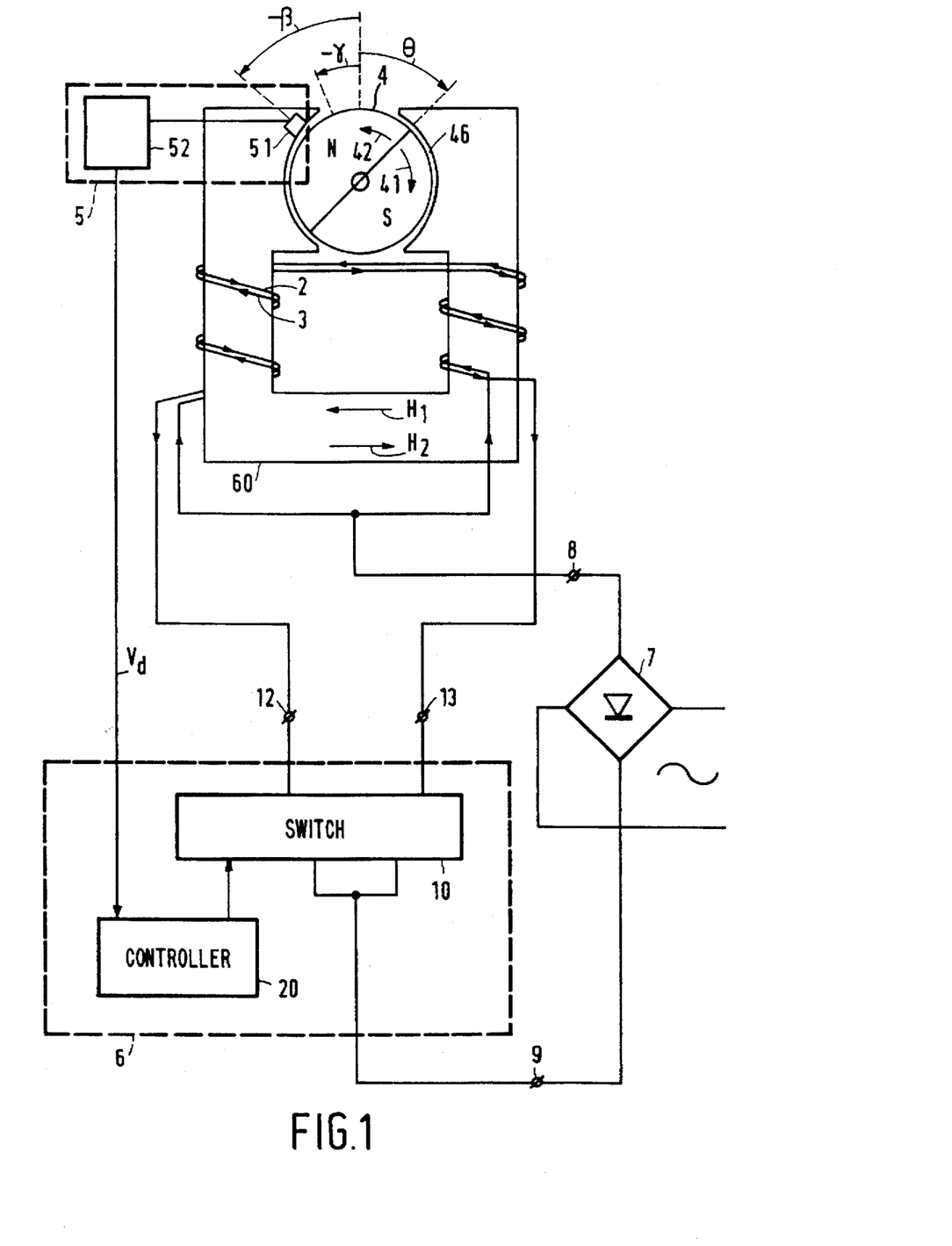
FIG. 1 shows an embodiment for the electric motor assembly according to the invention.

FIG. 1 shows an embodiment for an electric motor assembly 1 according to the invention. A power source 7 is connected to a power input formed by terminals 8 and 9. The motor assembly 1 comprises a stator 60 with coil means formed by two stator coils 2 and 3. By connecting the coil means to the D.C. power source 7 according to a first mode, in this case by excitation of coil 2, a magnetic stator field with a first polarisation $H_1$ is generated. By connecting the coil means to the D.C. power source 7 according to a second mode, in this case by excitation of coil 3, a magnetic stator field with a second opposite polarisation $H_2$ is generated.

Between the poles of the stator 60 a permanent magnet rotor 4 with a magnetic rotor field is arranged, said rotor being rotatable in a forward 41 and a reverse 42 direction of rotation and having a rotor position angle θ. Said angle θ is defined as being zero when the rotor field is opposite to the first polarisation $H_1$ of the stator field, the value of θ increasing upon rotation of the rotor 4 in the forward direction of rotation 41.

Figure 2:
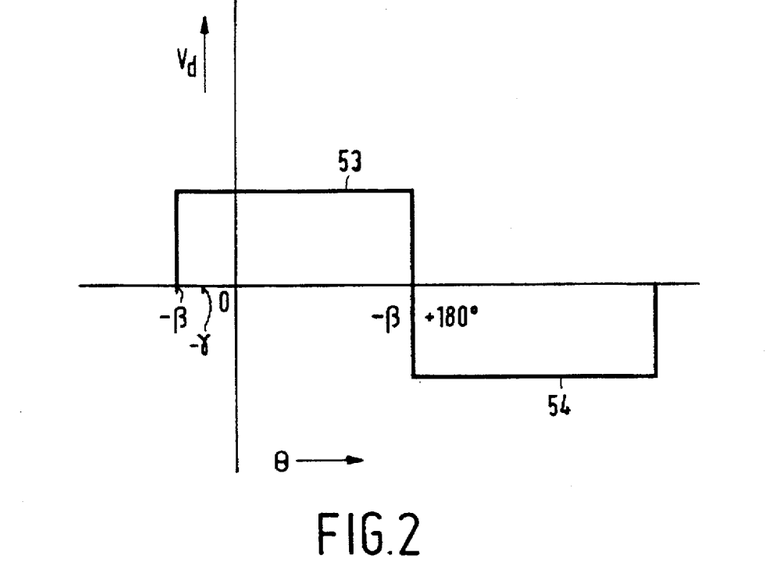
FIG. 2 shows the detection signal plotted against a rotor position.

To detect the rotor position θ, detection means 5 are provided. The detection means 5 comprise a Hall sensor 51 which is arranged such that this sensor is influenced by the magnetic field produced by the permanent-magnet rotor 4. Further, the detection means 5 comprise a electronic circuit 52 connected to the Hall sensor, which generates a detection signal $V_d$ which corresponds to a first position signal when having a voltage level 53 and corresponds to a second position signal when having a voltage level 54 (see FIG. 2). The detection means 5 generate the first position signal when the rotor position angle θ satisfies the relation $$-\beta < \theta < -\beta + 180°$$

and generate the second position signal for other θ, β being a precommutation angle having a predetermined value between 0° and 180° defining precommutation positions θ=−β and θ=−β+180°.

The motor assembly includes a commutation circuit 6 which comprises control means 20 connected to the detection means 5 and switching means 10 connected to control means. The switching means 10 connect the power input 9 to the first coil 2 in reaction to receiving the first position signal and connect the power input to the second coil 3 in reaction to receiving the second position signal so as to commute the coils 2 and 3 when the rotor 4 reaches the precommutation positions.

The air gap 46 between the rotor 4 and the stator 60 is made asymmetric such that the rotor 4 is driven to certain rest positions where the poles 0f the rotor 4 are facing the smaller pan of the air gap 46. In this way urging means are being conceived to urge the rotor 4 in a first rest position or a second rest position when the motor assembly is inoperative, said first rest and second rest positions being related to a predetermined rest angle γ according to the relation $$\theta = -\gamma$$

for the first rest position and according to the relation $$\theta = -\gamma + 180°$$

for the second rest position, said rest angle having a predetermined value in the range $0 < \gamma < \beta$.

The electric power source preferably comprises a D.C. power source 7 producing a substantially constant voltage. Such a D.C. voltage source 7 may comprise, for example, a customary D.C. rectifier circuit for rectifying the mains voltage of an AC voltage network.

By way of illustration FIG. 2 shows the detection signal $V_d$ plotted against the rotor position θ. The signal $V_d$ corresponds to the first position signal when having a voltage level 53 and corresponds to the second position signal when having a voltage level 54.

Figure 3:
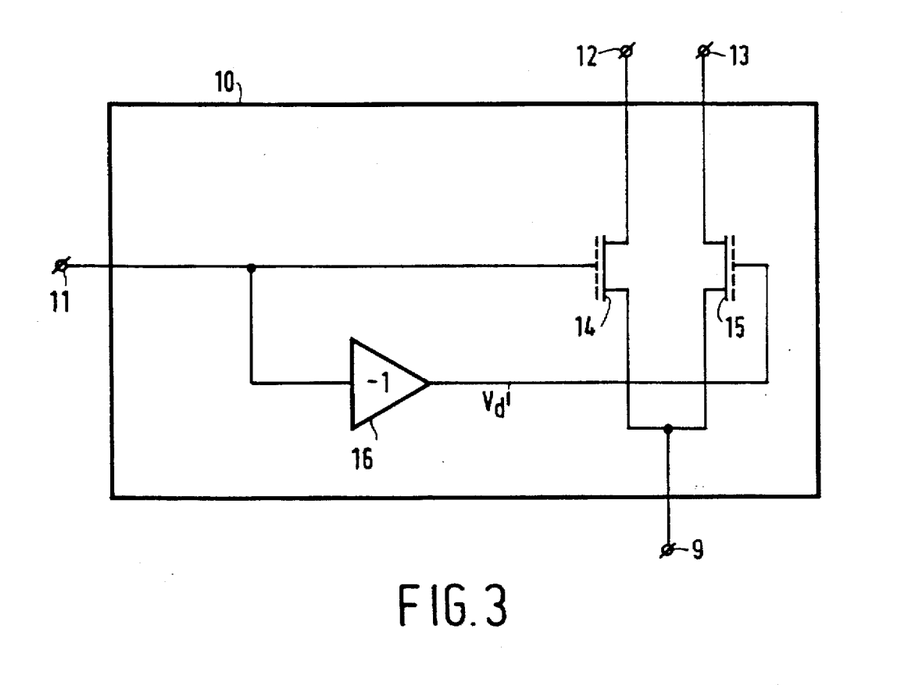
FIG. 3 shows an embodiment of the switching means.

FIG. 3 shows an embodiment of the switching means 10. In this embodiment the detection signal $V_d$ is applied via the control means to the input 11 of the switching means 10. The detection signal $V_d$ is applied as a control signal to a control input of a first voltage-controlled switch 14. The first switch 14 is situated between the terminal 9 and the connecting point 12 of the stator coil 2. The detection signal $V_d$ is inverted in an inverter circuit 16. An inverted detection signal $V_d$ obtained in this manner is applied as a control signal to a control input of a second voltage-controlled switch 15. The voltage-controlled switches 14 and 15 may be formed by transistors of the so-called FET type. However, alternative types of switches may also be used.

Figure 4:
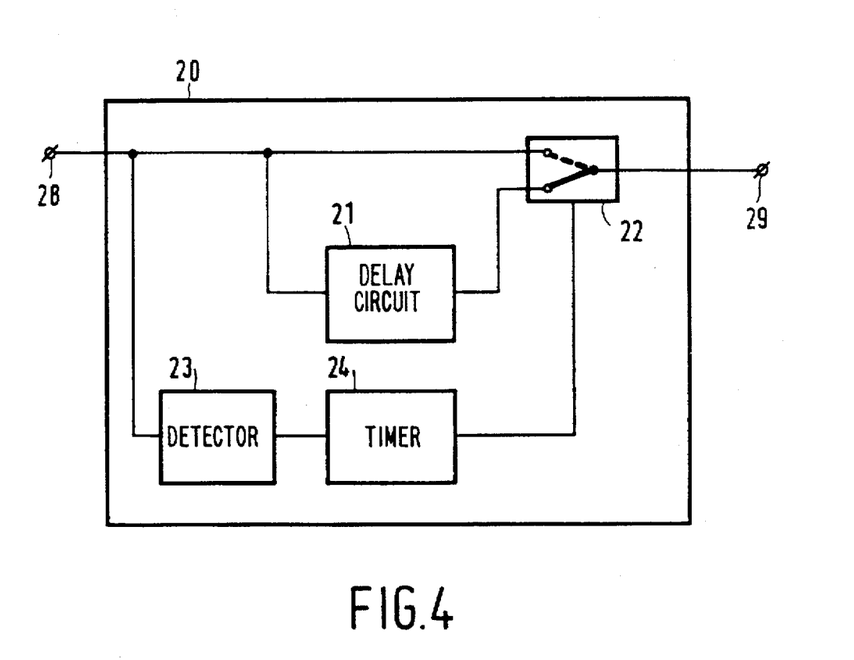
FIG. 4 shows a block diagram of the contents of the control means.

FIG. 4 shows a block diagram of the control means 20. The control means 20 comprise delay means 21, for example in the form of a delay line, for delaying the position signals with a delay time DT. The position signals are applied to the input 28 of the control means 20 in the form of the detection signal $V_a$. The delay can be switched on or off by means of the switch 22. The switch 22 is controlled by a timer 24 which switches on the delay during a predetermined control period S (see FIG. 5). The timer 24 is activated by a detection circuit 23 which, for example, detects the first voltage level change in the detection signal $V_a$. Alternatively, the timer 24 may be started upon energizing the electric motor assembly. The output 29 of the control means is connected to the input 11 of the switching means 10.

Figure 5:
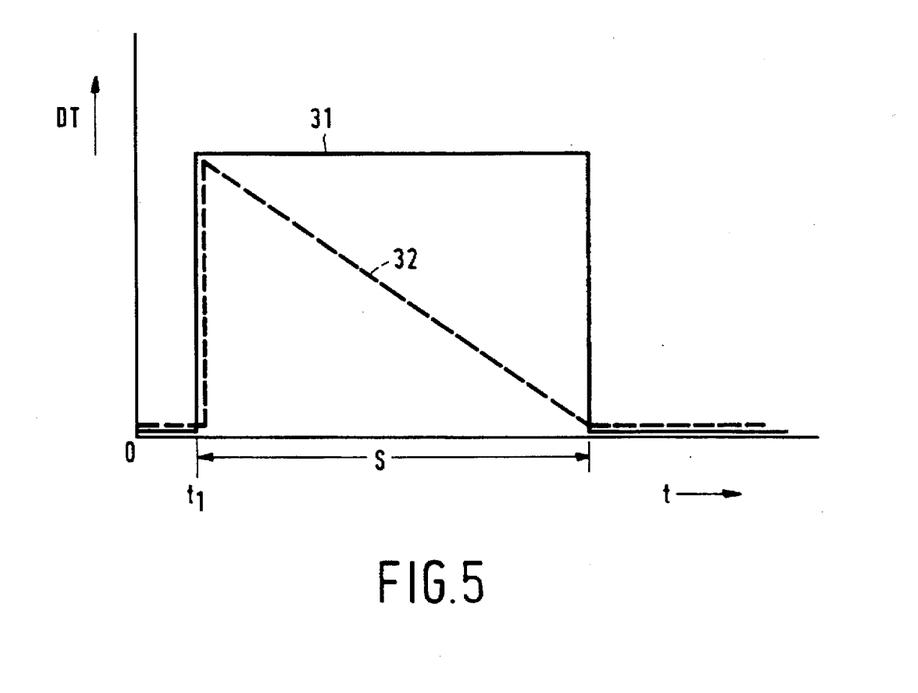
FIG. 5 shows the delay time as a function of time.

FIG. 5 shows the delay time DT as a function of time t, where t=0 is defined as the time at which the electric motor assembly is energized. According to a first embodiment a constant delay time DT is applied during a control period S according to the curve denoted with reference number 31. The control period S is started at a certain point of time $t_1$ after one of the precommutation positions θ=−β or θ=−β+180° is reached for the first time and before that precommutation position is reached for the second time so that DT=0 when that precommutation position is reached during rotation of the rotor 4 in the reverse direction 42 and DT>0 when that precommutation position is reached during rotation of the rotor 4 in the forward direction 41.

Figure 6:
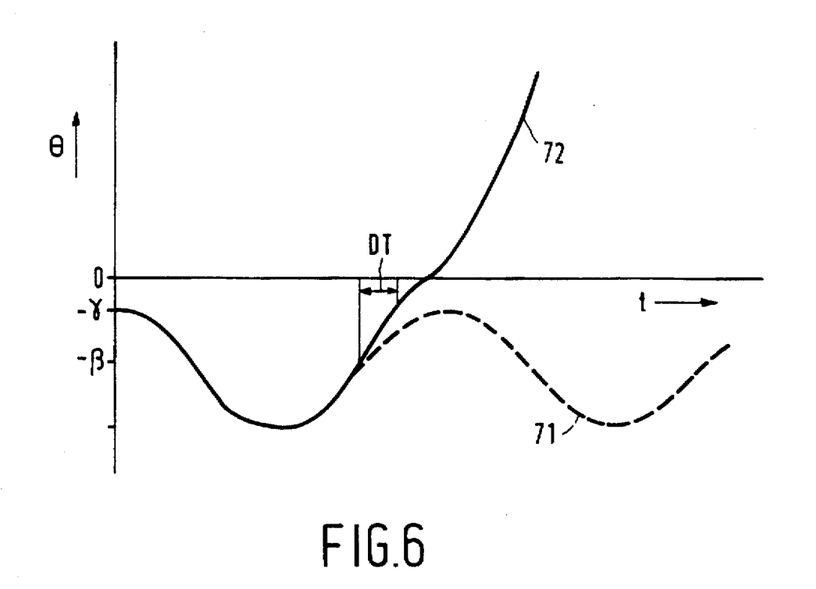
FIG. 6 shows the rotor position as a function of time according to a first embodiment of the invention.

FIG. 6 shows the rotor position θ as a function of time according to a first embodiment of the invention. At t=0 the rotor is positioned in the rest position θ=−γ. Since this rest position lies in the range −β to −β+180°, $V_d$ will correspond to the first position signal so that the first stator coil 2 will be energized. This will drive the rotor 4 in the reverse direction of rotation 42 so that θ will decrease and reach the precommutation position θ=−β for the first time. On reaching this precommutation position, the voltage level of $V_d$ will change according to the second position signal so that the second stator coil 3 will be energized. This results in a forward torque in the forward direction of rotation 41 so that the rotor 4 will be braked and then be driven in the forward direction of rotation 41. Without the measures according to the invention the stator coils 2 and 3 would again be commuted on reaching θ=−β for the second time. This results in a reverse torque in the reverse direction of rotation 42 so that the rotor 4 would be braked again and then be driven in the reverse direction 42. Hence, without the measures according to the invention, the rotor position θ as a function of time would oscillate around θ=−β according the curve denoted with reference number 71. By delaying the position signals with a delay time DT when the rotor 4 rotates in the forward direction of rotation 41, the rotor will still be driven in the forward direction of rotation during the delay time DT after reaching the precommutation position θ=−β for second time. Hence, the rotation speed of the rotor 4 will increase and after a properly chosen delay time DT, its speed will be so large that it will pass the neutral position θ=0 even when the rotor 4 is braked due to commutation of the coils. After passing the neutral position θ=0 the relative orientation of the rotor field and the stator field is such that the rotor 4 is again driven in the forward direction of rotation 41 so that the rotation speed of the rotor will further increase. Hence, with the measures according to the first embodiment of the invention the rotor position θ as a function of time will be according to the curve denoted with reference number 72. During the control period S the delay time DT will be applied on reaching precommutation positions so that the torque averaged over one revolution of the rotor 4 is increased by suppression of the reverse torque. Due to this measure the motor will start even under heavy load conditions.

Figure 7:
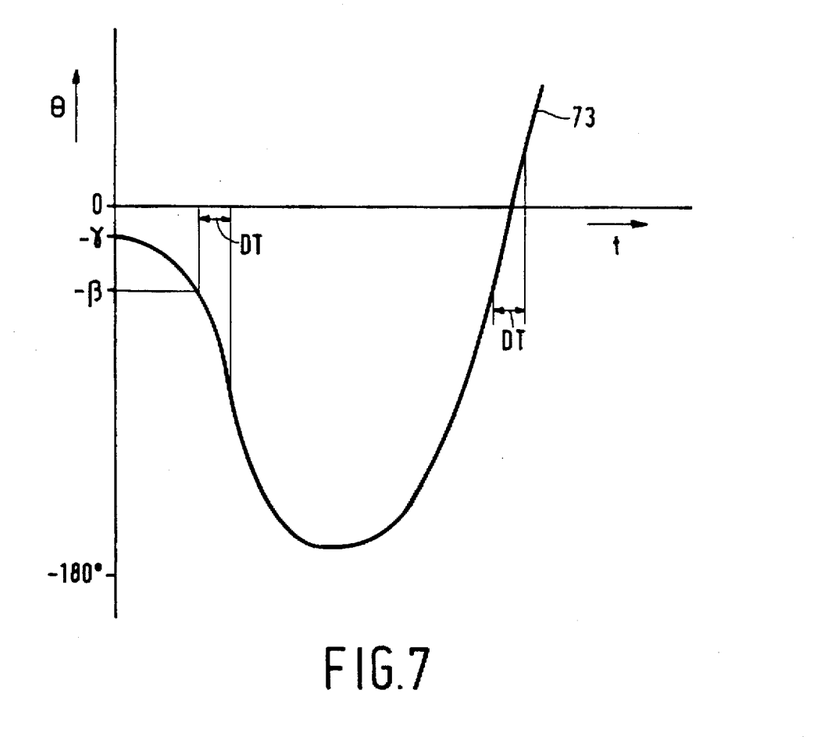
FIG. 7 shows the rotor position as a function of time according to a second embodiment of the invention.

According to a second embodiment of the invention, the control period S is started when the motor assembly is energized so that the a delay time is also applied when the rotor 4 rotates in the reverse direction of rotation. This embodiment simplifies the control means since the detection circuit 23 may be omitted.

FIG. 7 shows the rotor position θ as a function of time according to the second embodiment of the invention. At t=0 the rotor 4 is positioned in the rest position θ=−γ. Since this rest position lies in the range −β to −β+180°, $V_d$ will correspond to the first position signal so that the first stator coil 2 will be energized. This will drive the rotor 4 in the reverse direction of rotation 42 so that θ will decrease and reach the precommutation position θ=−β. On reaching this precommutation position, the voltage level of $V_d$ will change according to the second position signal. However, since a delay time DT is applied the commutation of the stator coils will be delayed so that the rotor speed will reach a larger value. After commutation of the stator coils a forward torque in the forward direction of rotation 41 will result so that the rotor 4 will be braked and then be driven in the forward direction of rotation. As can be seen from the curve denoted with reference number 73, the rotor 4 reaches a position θ which is further away from the precommutation position θ=−β than in the first embodiment of the invention (see FIG. 7). As a consequence, the rotor 4 will have a larger speed when reaching the precommutation position θ=−β for the second time so that this second embodiment renders it possible to reach the neutral position θ=0 with even larger loads and the same delay time DT.

The delay time DT is preferably chosen such that $$\beta/(60\omega) \le DT \le \beta/(20\omega),$$

wherein ω is the desired angular speed of the rotor 4 at the end of the control period S. This range assures that the average torque is positive up to the angular speed ω so that the rotor 4 is able to reach that speed. The desired angular speed ω of the rotor at the end of the control period S should be chosen such that the motor will continue to run without the delay. This desired angular speed ω should be chosen as low as possible and the delay time DT should be chosen as high as possible so as to obtain the highest load under which the motor will start.

A good performance of the electric motor assembly according to the invention is obtained when the parameters are chosen according to the following ranges:

$30° < \beta < 50°$ $5° < \gamma < 15°$ $100 < \omega < 600 °/s$ $0.2 < S < 2 \, s.$ Choosing the parameters from these ranges results in an electric motor assembly with a good power performance and good starting characteristics in relation to the volume and production costs of the motor. This makes the motor especially suitable for household appliances such as a lemon squeezer, a tin-opener or an icecream maker.

The performance of the electric motor assembly according to the invention may further be improved by reducing the delay time DT gradually to zero during the control period S according to the curve denoted with reference number 32 in FIG. 5. At the beginning of the control period S the rotor 4 will have a low speed so that a large delay time DT will result in a good suppression of the braking torque resulting in an optimal driving torque averaged over one revolution of the rotor 4. Near the end of the control period S the rotor 4 will have a relatively high speed so that a small DT results in an optimal average driving torque because the commutation of the polarisation of the stator field is relatively slow.

Figure 8:
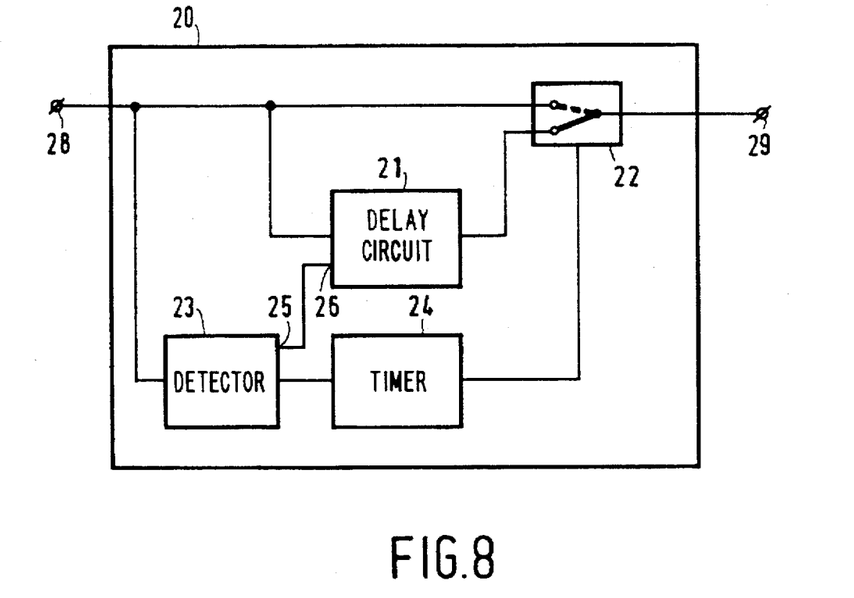
FIG. 8 shows the control means for a embodiment in which during the control period the delay time is made dependent of the rotation speed of the rotor.

FIG. 8 shows the control means 20 for a embodiment in which during the control period S the delay time DT is made dependent on the rotation speed of the rotor 4 such that the delay time DT is reduced with increasing rotation speed of the rotor. The detection circuit 23 has a second output 25 which gives a speed signal which is proportional to the time interval between two successive level changes of the detection signal $V_d$. This speed signal is led to a second input 26 of the delay means 21. The delay means 21 apply a delay time DT which is proportional to the speed signal and hence proportional to the rotation speed of the rotor 4. Due to these measures an optimum driving torque will be reached independent from the motor load.

Figure 9:
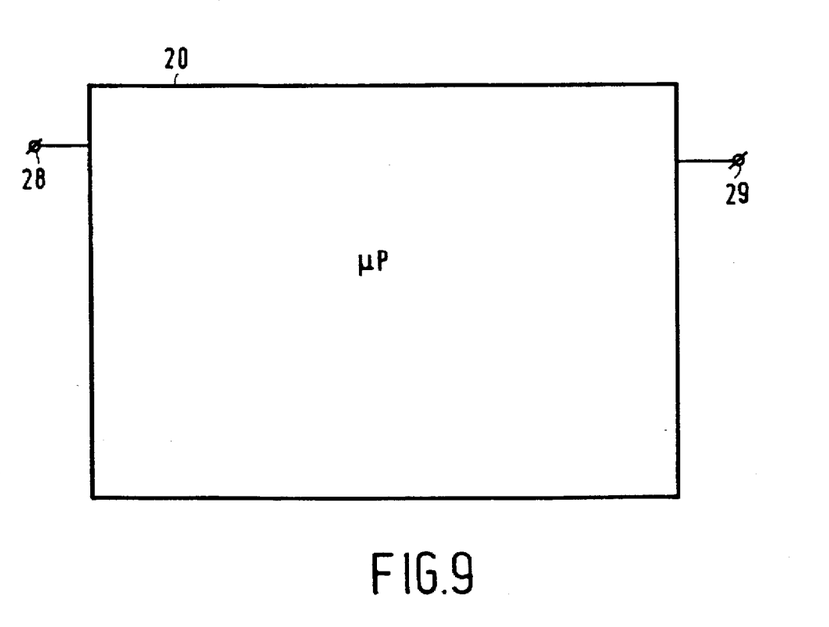
FIG. 9 shows control means embodied as a programmed microcomputer.

FIG. 9 shows control means 20 embodied as a programmed microcomputer with a input 28 and an output 29. The functions of the control means 20 as explained above can also be performed by such a programmed microcomputer. With a microcomputer the control means 20 can easily be adapted to the specific load conditions of the application of the motor assembly. Moreover, in many applications a microcomputer is already present so that the control means 20 can be realized almost without additional costs.

Hereinbefore the invention has been described with reference to embodiments in which the rotor is a so-called two pole rotor. It is to be noted that the electric motor assembly according to the invention can also be manufactured comprising a quadropole or multipole rotor. Furthermore, the stator coil means could be realized by a single coil and commutation would then be realized by changing the direction of the current through the coil. The coils 2 and 3 could also be realized by winding coil 2 on one leg of the stator 60 and coil 3 on the other leg of the stator.

It will thus be seen that the objects set forth above, and those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described, and all statements of the invention, which as a matter of language, might be said to fall therebetween.

We claim:

1. An electric motor assembly comprising
   a power input for connecting the motor assembly to a DC power source, a stator with coil means to generate a magnetic stator field with a first polarisation when connected to said power source according to a first mode and to generate a magnetic stator field with a second opposite polarisation when connected to said power source according a second mode, a permanent magnet rotor with a magnetic rotor field, said rotor being rotatable in a forward and a reverse direction of rotation and having a rotor position angle θ, said angle θ being defined as being zero when the rotor field is opposite to the first polarisation of the stator field, the value of θ increasing upon rotation of the rotor in the forward direction of rotation, detection means being conceived to generate a first position signal when the rotor position angle θ satisfies the relation $$-\beta<\theta<-\beta+180°$$

and being conceived to generate a second position signal for other angles of θ, β being a precommutation angle having a predetermined value between 0° and 180° defining precommutation positions θ=−β and θ=−β+180°, switching means connected to the detection means, said switching means being conceived to connect the power input to the coil means according to said first mode in reaction to receiving the first position signal and to connect the power input to the coil means according to said second mode in reaction to receiving the second position signal so as to commute the coil means when the rotor reaches the precommutation positions, urging means to urge the rotor in a first rest position or a second rest position when the motor is inoperative, said first and second rest positions being related to a predetermined rest angle γ according to the relation $$\theta=-\gamma$$

for the first rest position and according to the relation $$\theta=-\gamma+180°$$

for the second rest position, said rest angle having a predetermined value in the range $0<\gamma<\beta$, control means situated between the detection means and the switching means, said control means comprising delay means for delaying one of the position signals with a delay time DT, characterized in that, the control means are conceived to apply a delay time DT>0 when the rotor rotates in the forward direction of rotation during a predetermined control period S.

2. An electric motor assembly according to claim 1, characterized in that the control period S is set to begin when the motor assembly is energized so that the delay time DT is also applied when the rotor (4) rotates in the reverse direction of rotation (42).

3. An electric motor assembly according to claim 1, characterized in that the control period S is set to begin at a point of time after one of the precommutation positions θ=−β or θ=−β+180° is reached for the first time and before that precommutation position is reached for the second time so that DT=0 when that precommutation position is reached during rotation of the rotor in the reverse direction and DT>0 when that precommutation position is reached during rotation of the rotor in the forward direction (41).

4. An electric motor assembly according to claim 1 characterized in that during the control period S, the delay time DT satisfies the relation $$\beta/(60\omega) \leq DT \leq \beta/(20\omega),$$

wherein β is expressed in ° and ω is the desired angular speed of the rotor expressed in °/s at the end of the control period S.

5. An electric motor assembly according to claim 4, characterized in that $$30°<\beta<50°$$

$$5°<\gamma<15°$$

$$100<\omega<600°/s$$

$$0.2<S<2s.$$

6. An electric motor assembly according to claim 1 characterized in that the delay time DT is gradually reduced to zero during the control period S.

7. An electric motor assembly according to claim 1 characterized in that during the control period S the delay time DT is dependent of the rotation speed of the rotor, the delay time DT being reduced with increasing rotation speed of the rotor.

8. An electric motor assembly according to claim 1, characterized in that the control means comprise a programmed microcomputer.

* * * * *